United States Patent [19]
Kohler

[11] 3,916,474
[45] Nov. 4, 1975

[54] WIPER BLADE SUPPORT CONSTRUCTION

[75] Inventor: Alfred Kohler, Bietigheim, Germany

[73] Assignee: SWF-Spezialfabrik fur Autozubehor Gustav Rau GmbH, Germany

[22] Filed: Apr. 8, 1974

[21] Appl. No.: 458,687

[52] U.S. Cl. .............................................. 15/250.42
[51] Int. Cl.² ............................................ B60S 1/04
[58] Field of Search ..................... 15/250.36, 250.42

[56] References Cited
UNITED STATES PATENTS

| | | | |
|---|---|---|---|
| 2,706,291 | 4/1955 | Rappl ......................... | 15/250.42 X |
| 2,888,702 | 6/1959 | Sussex ........................ | 15/250.42 |
| 2,955,313 | 10/1960 | Anderson ..................... | 15/250.42 |

*Primary Examiner*—Peter Feldman
*Attorney, Agent, or Firm*—McGlew and Tuttle

[57] ABSTRACT

A wiper blade support which is suitable for use in supporting wiper blades on vehicles comprises a main yoke which is adapted to be connected to a wiper arm intermediate its length and at least one connecting yoke which is pivoted intermediate its length to the main yoke and has opposite ends with means such as claws for engaging the wiper blade. The connecting yoke is biased away from the main yoke by an auxiliary support spring having one end with a porjection which is engageable in a selected one of a plurality of longitudinally spaced openings in the main yoke and which has an opposite end whcih is biased against the surface of the connecting yoke at a location between one of the ends of the connecting yoke and its pivotal connection to the main yoke. The location of the connection of the spring to the main yoke determines the amount of engagement pressure of the one end of the U-shaped of V-shaped spring with the connecting yoke.

6 Claims, 3 Drawing Figures

U.S. Patent  Nov. 4, 1975  3,916,474
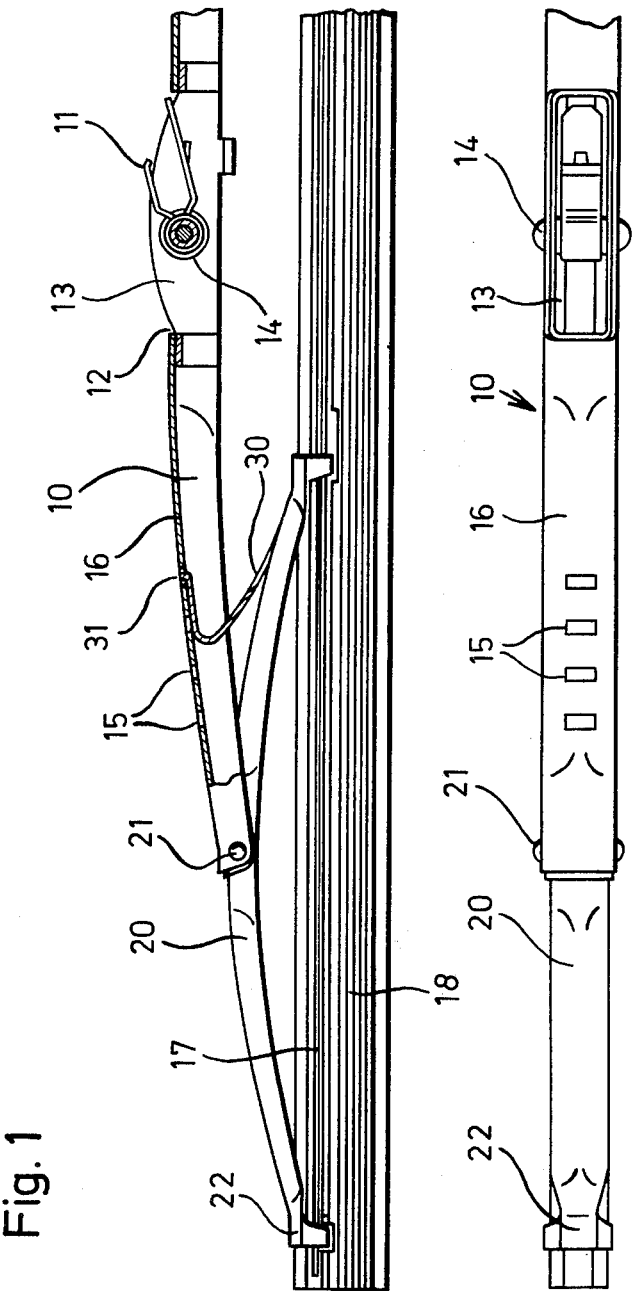
Fig. 1
Fig. 2
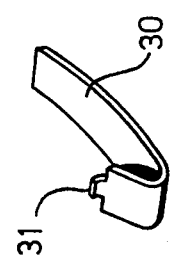
Fig. 3

WIPER BLADE SUPPORT CONSTRUCTION

BACKGROUND OF THE INVENTION

1. Field of the Invention

This invention relates in general to windshield wiper construction and in particular to a new and useful wiper blade support which includes at least one connecting yoke which is supported on a main yoke and which is biased away therefrom by an auxiliary spring which has end which may be connected to the main yoke at a spaced location along its end and an opposite end which is biased against the connecting yoke.

2. Description of the Prior Art

It is particularly necessary with long wiper blades to use one or more connecting yoke which are pivotally connected to a main yoke for example at the ends thereof. With such a construction it is desirable to obtain an even pressure application on the wiper blade over its whole length. With such wiper blade constructions it has been found that the force applied on the connecting yoke and through the connecting yoke to the blade diminishes during the use of the blade since the biasing spring elements lose their resilience due to aging. Blade constructions are known in which the spring elements comprise bent members which are arranged between the parts to produce an increased pressure application force in the installed position. Such a construction however does not provide a change in the resilience after the aging of the wiper blades and the springs.

SUMMARY OF THE INVENTION

In accordance with the present invention there is provided a wiper blade support which includes one or more connecting yokes which is pivoted to a main yoke and which is biased in a direction away from the main yoke toward the blade by means of a spring which may be adjustably positioned so that the spring tension thereon acting between the two yokes may be varied. In the preferred form the spring comprises a U-shaped or V-shaped member having a projection which is engageable into one or more longitudinally spaced slots on the main yoke. In accordance with whether the spring is placed closer to or further away from the pivot connecting yoke to the main yoke, the spring tension will be increased or decreased. The spring is constructed so that its engagement end includes a projection which engages into a selected slot on the main yoke and extends downwardly therefrom toward the pivot of the connection between the connecting yoke and the main yoke and then includes an end which extends backwardly and rests against the connecting yoke and provides a biasing force between the two yokes. In the preferred form the spring comprises a flat leaf spring with a plug extension on its one end and it is engageable between the two yokes in a manner such that it will be biased in position and will not fall out due to its inherent tension. The support spring may be secured in the operating position without requiring any additional securing elements since the apertures as defined in the main yoke are adapted to the cross section of a plug extension on the flat support spring and they locate it in a selected position and hold it against rotation.

Accordingly it is an object of the invention to provide an improved wiper blade support which includes a connecting yoke which is pivoted to a main yoke and which is biased away from the main yoke by a spring interposed therebetween and which is adjustably poditioned along the length of the yokes.

A further object of the invention is to provide a wiper blade construction which is simple in design, rugged in construction and economical to manufacture.

For an understanding of the principles of the invention, reference is made to the following description of a typical embodiment thereof as illustrated in the accompanyings.

BRIEF DESCRIPTION OF THE DRAWINGS

In the Drawings:

FIG. 1 is a partial side elevational and partial longitudinal sectional view of a wiper blade support constructed in accordance with the invention;

FIG. 2 is a top plan view of the portion of the wiper blade support shown in FIG. 1; and FIG. 3 is front top perspective view of a support spring employed in the wiper blade construction shown in FIGS. 1 and 2.

GENERAL DESCRIPTION OF THE PREFERRED EMBODIMENT

Referring to the drawings in particular the invention embodied therein comprises a wiper blade support structure which includes yoke 10 having an intermediate recess 12 for accommodating a wiper arm connecting member 13. In the embodiment shown the wiper arm connecting member 13 is located centrally in respect to the wiper blade and the yoke 10. The connecting member 13 includes a shaft or bearing pin 14 which is connectable to a wiper arm (not shown) and a two-shanked stop spring 11 is engaged with its central portion around the pin 14 and has respective shank portions which engage over the connecting member 13.

In accordance with the invention at least one intermediate yoke or claw yoke 20 is connected intermediate its length by a pivot 21 to the main yoke 10. The connecting yoke 20 has respective ends with engagement claws 22 and 22' which engage over the top of a wiper blade 18 having longitudinally spaced engagement recesses 25 and 25' located at a spaced location from a top 17 thereof. The blade 18 has spring rails 19 inserted therein.

In accordance with a principal feature of the invention spring means 30 are provided between the main yoke 10 and the connecting yoke 20 which permit adjustable resilient biasing between these parts. In the preferred form of the invention the spring ring comprises a flat substantially U-shaped or V-shaped spring having a relatively short leg portion 30a with an outwardly extending rectangular projection 31 which is engageable into a selected one of a plurality of longitudinally spaced slots 15 which are defined in the main yoke 10. If the spring support 30 is inserted in the aperture 15 nearest to the connecting member 15 as shown in FIG. 1 for example and a longer leg portion 30b of the spring 30 bears against the connecting yoke 20 with the minimal tensioning force. If the plug extension or projecting 31 of the support spring 30 is inserted into an aperture 15 which is closest to the hinge or pivot 21 then the spring 30 is pre-tensioned to the greatest possible extent so that it exerts a greater pressure on the end region between the yoke 20 and the main yoke 10. Thus, in accordance eith the position of the spring 30 the tension between the main yoke 10 and the connecting yoke 20 may be varied as desired.

The support spring 30 is preferably bent into a U-shaped or V-shaped configuration and its width is adapted to the inside spacing of the side walls of the main yoke 10. The free end 30b of the support spring 30 which rests on the yoke 20 is preferably of a width which is adapted to the width of the end region of the intermediate yoke 20. The spring 30 may be supported on a single armed intermediate yoke 20 when the yokes are covered by a main yoke.

While a specific embodiment of the invention has been shown and described in detail to illustrate the application of the principles of the invention, it will be understood that the invention may be embodied otherwise without departing from such principles.

What is claimed is:

1. A wiper blade support suitable for use in supporting a wiper blade on vehicles, comprising a main yoke adapted to be connected intermediate its length to a wiper arm, at least one connecting yoke pivoted intermediate its ends on said main yoke and having respective ends with means thereon for engaging a wiper blade, and an auxiliary support spring adjustable connectable between said main yoke and said connecting yoke between an end of said connecting yoke and its pivotal connection to said main yoke and biasing aid connecting yoke away from said main yoke, said support spring comprising a flat spring having one end with an outwardly extending projection, said main yoke having a plurality of longitudinally spaced recesses, said projection being engageable in a selected one of said recesses in order to vary the biasing force between said main yoke and said connecting yoke.

2. A wiper blade support according to claim 1, wherein said main yoke comprises a channel shaped member having spaced apart side walls and with the channel opening downwardly, said support spring being of a width permitting it to be inserted between the side walls of said main yoke.

3. A wiper blade support suitable for use in supporting a wiper blade on vehicles, comprising a main yoke adapted to be connected intermediate its length to a wiper arm, at least one connecting yoke pivoted intermediate its ends on said main yoke and having respetive ends with means thereon for engaging a wiper blade, and an auxiliary support spring adjustable connectable between said main yoke and said connecting yoke between an end of said connecting yoke and its pivotal connection to said main yoke and biasing said connecting yoke away from said main yoke, said auxiliary support spring comprises a substantially U-shaped member having a first leg portion with a projection, said main yoke having a plurality of receiving recesses along its length in which said projection is engageable, the opposite end of said spring bearing against said connecting yoke.

4. A wiper blade support according to claim 3, wherein said projection is substantially rectangular and it is held in a receiving recess of said main yoke without permitting rotation.

5. A wiper blade support suitable for use in supporting a wiper blade on vehicles, comprising a main yoke adapted to be connected intermedaite its length to a wiper arm, at least one connecting yoke pivoted intermediate its ends on said main yoke and having respective ends with means thereon for engaging a wiper blade, and an auxiliary support spring adjustable connectable between said main yoke and said connecting yoke between an end of said connecting yoke and its pivotal connection to said main yoke and biasing said connecting yoke away from said main yoke, said auxiliary support spring is substantially U-shaped and includes a short arm portion having a projection, and an opposite long arm portion adapted to rest against said connecting yoke, said main yoke having a plurality of spaced receiving recesses thereon, said projection being engageable in a selected one of said receiving recesses.

6. A wiper blade support according to claim 5, wherein said receiving recesses are substantially rectangular and said projection is sized to engage therein without permitting rotation thereof.

* * * * *